March 28, 1961
R. S. HINSEY
2,976,744
MECHANISM CONTROL
Filed June 10, 1957
2 Sheets-Sheet 1
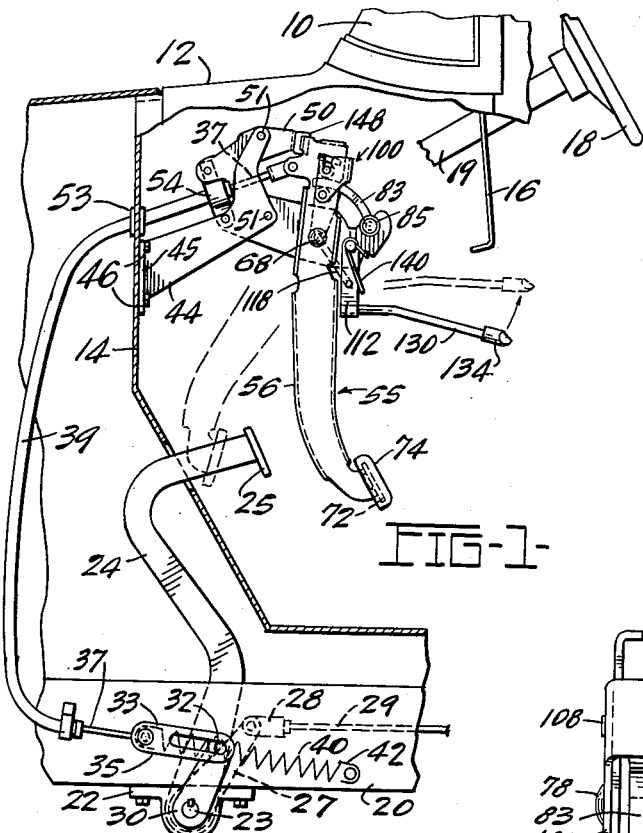
FIG-1-
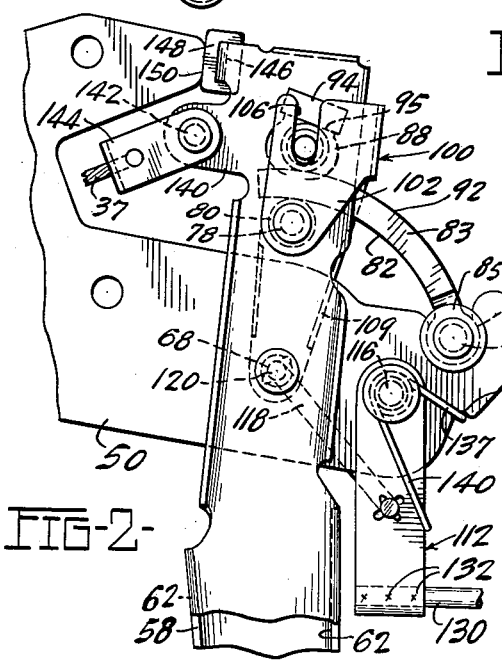
FIG-2-
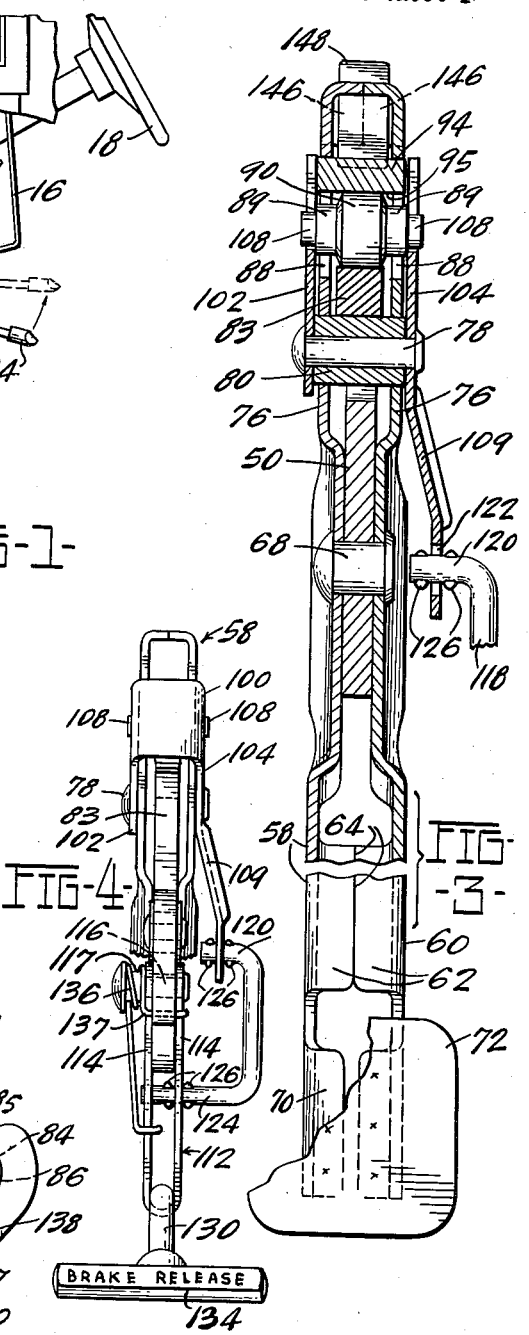
FIG-4-
FIG-3-
INVENTOR:
ROBERT S. HINSEY.
BY
Harry O. Ernsberger
ATTY.

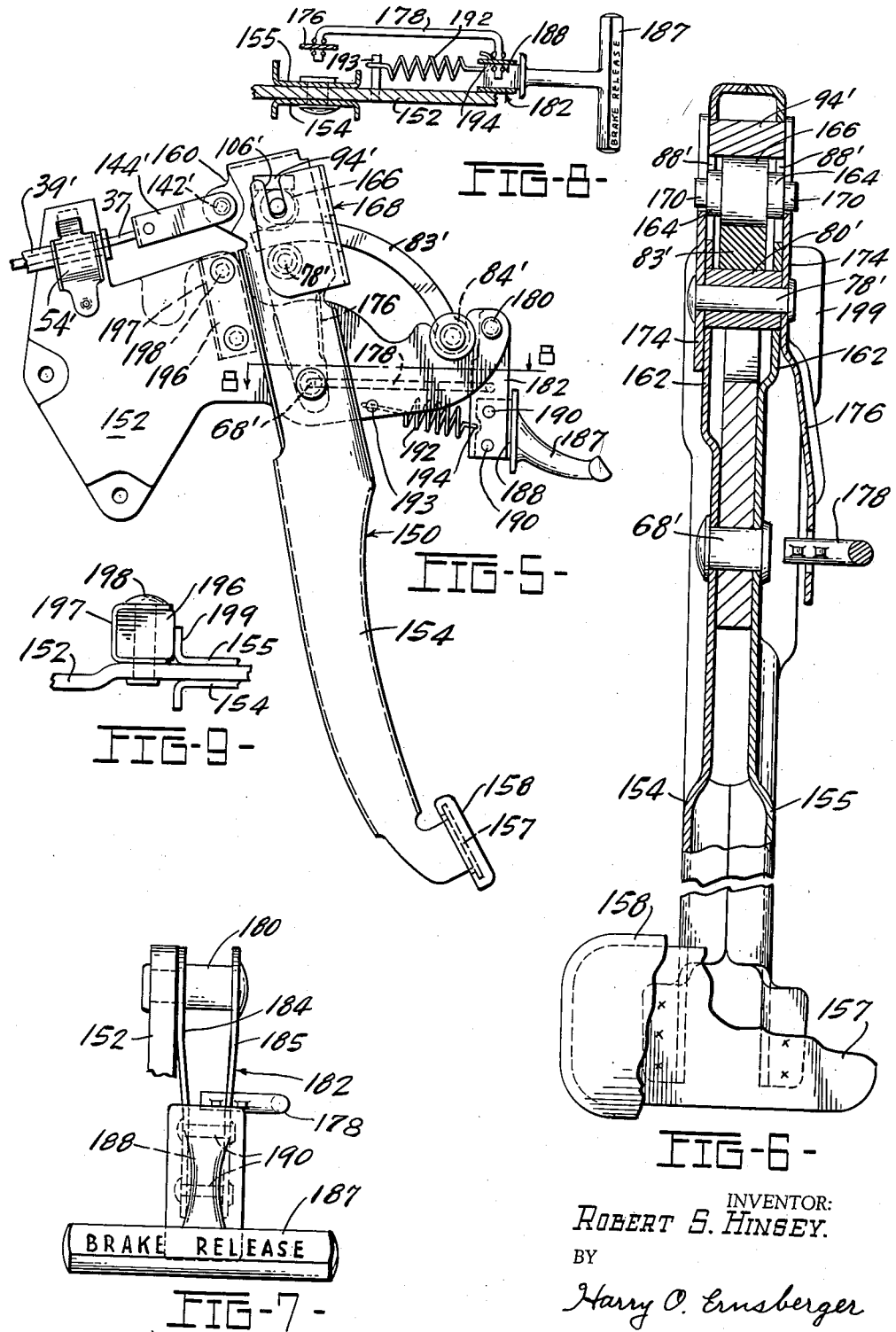

United States Patent Office 2,976,744
Patented Mar. 28, 1961

2,976,744
MECHANISM CONTROL
Robert S. Hinsey, Toledo, Ohio, assignor to The Bingham-Herbrand Corporation, Toledo, Ohio, a corporation of Ohio Filed June 10, 1957, Ser. No. 664,664

1 Claim. (Cl. 74—531)

This invention relates to mechanism controls and more especially to means or mechanism for actuating or controlling the parking or emergency brake mechanism of an automotive vehicle.

The invention embraces the provision of a foot operated lever construction embodying a lever retaining means or clutch construction of a character normally effective for retaining the foot operated lever in any position of adjustment and to improved means for readily releasing the lever when desired.

An object of the invention resides in a construction of foot operated lever especially adapted for use in controlling the parking brakes of a vehicle and embodying means for normally retaining the foot operated lever in a brake setting position, the arrangement including a supplemental lever and linkage operable for releasing the lever retaining means requiring a minimum of force to release the brake mechanism.

An object of the invention is the provision of a foot operated lever arrangement for actuating vehicle brakes, the arrangement including a releasing mechanism comprising a supplemental lever pivotally supported independently of the foot operated brake lever for controlling or releasing a retaining means normally effective for holding the foot operated lever in brake setting position.

Another object of the invention is the provision of a foot operated brake actuating lever or device incorporating a clutch means for retaining the foot operated lever in position to set the brakes of a vehicle, the arrangement including a supplemental lever mounted independently of the foot operated brake lever for effecting a release of the clutch and spring means associated with the supplemental lever for biasing the clutch or lever retaining means toward lever retaining position.

Another object of the invention resides in the provision of a release mechanism for a foot operated brake actuating lever, the release mechanism including an auxiliary lever having a manipulating portion within convenient and easy reach of the vehicle operator.

Another object of the invention is the provision of simple, yet effective, resilient abutment means for absorbing the impact of the foot operated lever upon its return to normal or brake release position.

Further objects and advantages are within the scope of this invention such as relate to the arrangement, operation and function of the related elements of the structure, to various details of constructions and to combinations of parts, elements per se, and to economies of manufacture and numerous other features as will be apparent from a consideration of the specification and drawing of a form of the invention which may be preferred, in which:

Figure 1 is a fragmentary elevational view partly in section showing a portion of an operator's compartment of a vehicle illustrating a form of the invention incorporated therein;

Figure 2 is an enlarged elevational view of the upper portion of the foot operated or pedestal lever arrangement shown in Figure 1;

Figure 3 is a vertical sectional view through the foot operated lever construction shown in Figures 1 and 2;

Figure 4 is a front elevational view of a portion of the lever construction shown in Figure 1;

Figure 5 is a side elevational view of a lever construction showing a modified form of lever release manipulating means;

Figure 6 is a vertical sectional view through the lever construction shown in Figure 5;

Figure 7 is a front elevational view illustrating the brake release manipulating means of the arrangement shown in Figure 5;

Figure 8 is a detail sectional view taken substantially on the line 8—8 of Figure 5, and Figure 9 is a detail view illustrating a lever movement limiting or stop means.

While the mechanism control of my invention is illustrated as embodied in a vehicle for actuating or controlling the emergency or parking brakes, it is to be understood that I contemplate the utilization of the invention with any apparatus or mechanism where the same may be found to be adaptable.

Referring to the drawings in detail, and first with respect to the arrangement shown in Figure 1, there is illustrated a portion of the operator's compartment of an automotive vehicle. The portion of the vehicle shown includes a windshield 10, a cowl portion 12, a dashboard or fire wall 14, an instrument panel 16 and a steering wheel 18 mounted on a column 19. A side frame member of the vehicle construction is shown at 20, it being understood that a similar frame member is disposed at the opposite side of the vehicle construction. Secured to the frame members 20 are brackets 22, one of which is shown in Figure 1, the brackets journally supporting a transversely extending shaft 23.

Fixedly secured upon the shaft 23 is a service brake pedal 24 equipped with a foot pad portion 25. The service brake pedal 24 may be connected with hydraulically operated mechanism for setting the brakes of the vehicle in the conventional manner. Mounted upon the shaft 23 is an arm 27 to which is pivotally connected a clevis member 28 which is secured to a rod or cable 29 connected with the parking brake mechanism (not shown) of the vehicle. As shown in Figure 1, the service brake pedal 24 mounted upon the shaft 23 is arranged to actuate the brake mechanism through the medium of the rod 29, but in certain installations the emergency or parking brakes may be independently connected with the parking brake control mechanism hereinafter described.

As shown in Figure 1, the shaft 23 is equipped with an arm 30 which is keyed or otherwise fixedly secured to the shaft. The distal end of the arm 30 is provided with a pin 32 which extends into an elongated slot 33 formed in a link or member 35. The member 35 is connected to one end of a flexible cable 37 which is enclosed within a sheath or guide 39 for slidable movement therein. A contractile coil spring 40 connects the pin 32 with an anchor member 42 carried by the frame member 20 of the vehicle which is adapted to urge or bias the member 35 toward brake releasing position, that is, in a right-hand direction as viewed in Figure 1. In installations wherein the service brake pedal 24 rotates the shaft 23 in setting the vehicle brakes, the pin 32 is adapted for slidable movement within the slot 33 without affecting the position of the link or member 35.

The emergency or parking brake mechanism control of the invention is carried by a mounting bracket 44 which may be secured to suitable adjacent structure of the vehicle, and in the embodiment illustrated, is provided with a flange portion 45 secured to the dashboard or fire wall 14 by means of bolts 46.

The lever construction is inclusive of a support or supporting plate 50 adapted to be secured to the mounting bracket 44 by means of bolts 51. The sheath 39 enclosing the cable 37 extends upwardly and through a grommet 53 mounted in the dashboard 14, the upper extremity of the sheath being secured to the lever support 50 by means of a suitable clamp 54.

The lever construction 55 for actuating the parking or emergency brakes of a vehicle is of the foot operated type. The lever construction includes a lever or lever body 56 formed of two matched sections or components 58 and 60 formed of sheet metal and each component provided with inwardly extending flanges 62 which are in abutting relation and welded at the juncture line 64, the flange portions 62 being disposed below the fulcrum of the lever body 56. The sections 58 and 60 are formed with openings in registration with an opening in the support 50 adapted to receive a stub shaft or rivet 68 providing a fulcrum or pivotal support for the lever 56, the fulcrum being intermediate the ends of the lever construction in the embodiment illustrated. The lower extremities of the lever components 58 and 60 are fashioned with laterally extending flanges 70 to which is welded a foot pad or plate portion 72. The foot plate 72 is of metal and may be covered by a pad 74 of rubber or similar material.

The upper region of the lever 58 is formed with parallel wall portions 76 which are spaced as shown in Figure 3. Extending through openings in the wall portions 76 is a stub shaft or rivet 78 upon which is journalled a cylindrical sleeve or bushing 80, the end zones of which extend into openings formed in the wall portions 76 of the lever components 58 and 60.

The sleeve or bushing 80 forms an abutment for direct engagement with a lower curved surface 82 of an arcuately shaped bar or member 83 which forms an element of the clutch construction or means for holding the lever arrangement in adjusted or brake setting position. One end of the bar 83 is formed with an enlarged circular head portion 84, as shown in Figure 2, which is snugly received in a suitable opening formed in the support 50.

As shown in Figure 2, the opening accommodating the circular head portion 84 of the bar 83 is greater than a semi-circle providing a restricted throat through which extends the curved portion of the bar, facilitating limited pivotal movement of the bar 83 about the axis of the head portion 84 but restrained against longitudinal movement relative to the support 50. Disks or washers 85 are disposed at either side of the support 50 and receive a rivet or stub shaft 86 to prevent lateral displacement of the bar 83.

The wall portions 76 of the lever body construction are provided with suitable openings 88, as shown in Figures 2 and 3, which provide clearance for shoulder portions 89 formed on a lever retaining means, clutch or clutch roller 90. The peripheral surface of the clutch roller 90 is arranged for direct contact with the upper curved or arcuate surface 92 of the bar 83, the said arcuate surface forming a clutching region or area cooperating with the clutch member or roller 90.

The wall portions 76 of the lever sections 60 and 62 are fashioned or formed with generally rectangular openings in communication with the clearance openings 88 and within which is snugly fitted a rectangularly-shaped hardened abutment block or clutch component 94, the lower surface 95 of which forms a clutch surface which is adapted for engagement or contact with the periphery of the clutch roller or member 90. It should be noted that the hardened block or abutment 94 is so disposed that the clutching surface 95 thereof is angularly arranged with respect to the curvature of the arcuately shaped bar 83 whereby the clutch roller or member 90 is disposed between convergingly arranged surfaces in the region of contact of the roller with the abutment 94 and the bar 83.

The clutch roller 90, in cooperative wedging relation with the clutching surfaces provided by surface 92 on the bar 83 and surface 95 on the abutment block 94, provides a friction means or lock to retain the lever member 55 in brake setting positions.

The invention is inclusive of means for actuating and controlling the operation or movement of the clutch roller 90 into or out of lever retaining or clutching position. The control mechanism for the clutch roller 90 is inclusive of a supplemental lever or arm 100 configured with a U-shaped portion providing spaced parallel walls 102 and 104 astraddle the upper portion of the lever construction defined by the wall portions 76 as shown in Figures 2 and 3.

The parallel walls 102 and 104 of the clutch controlling member 100 are provided with openings through which extend the rivet or stub shaft 78 which serves as a pivotal support or fulcrum for the clutch control member or lever 100. The walls 102 and 104 are provided with vertically arranged open ended slots 106 of a dimension to snugly accommodate cylindrical tenons 108 integrally formed on the clutch roller 90, the slots providing for rotational movement of the clutch roller 90.

The tenons 108 on the clutch roller 89 are of a diameter to provide a snug fit between the edges of the slots so that substantially no lost motion obtains between the peripheries of the tenons and the edge walls of the slots.

A comparatively small pivotal movement of the manipulating or control member 100 about the axis of the shaft 78 is sufficient to actuate the clutch member or roller 90 into and out of clutching or frictional engagement with the adjacent surfaces of the arcuate bar 83 and the abutment block 94.

The clutch control or actuating member 100 is formed with a depending portion or arm 109 which is formed as an integral extension of the wall portion 104. Means is provided associated with the arm 109 for actuating the clutch control member 100 to render the clutch effective or ineffective to hold the foot operated brake actuating lever in brake setting or adjusted positions. A form of control means of the invention is illustrated in Figures 1 through 4 and is inclusive of an arm or supplemental lever member 112. The member 112 is formed of sheet metal to a U-shaped configuration as shown in Figure 4, the spaced parallel wall portions 114 thereof being astraddle of a portion of the supporting plate or bracket 50. The upper end regions of the walls 114 are formed with openings which register with an opening in the support 50 and are adapted to accommodate a stub shaft or rivet 116. The member 112 is connected with the arm 109 of the clutch control means by means of a rod or link 118. As particularly shown in Figure 4, one end region 120 of the rod 118 extends at right angles to the major body of the rod and projects into an opening 122 formed in the end of the arm 109. The opposite end region 124 of the rod 118 extends into aligned openings formed in the walls 114 of the member 112. The link or rod 118 is secured against lateral displacement by means of struck-up lugs or projections 126 integrally formed upon the end regions 120 and 124 of the link.

Disposed within the bight configuration of the member 112 is a rod or bar 130 which is welded to the member 112 as indicated at 132 forming a manipulating lever construction for the clutch control member 100. The distal end of the rod is provided with a hand grip or handle 134 which is normally disposed beneath and adjacent the instrument panel 16 as illustrated in Figure 1, and sufficiently below the instrument panel to permit swinging movement of the lever 112 and rod 130 to the broken line position shown in Figure 1 in order to provide sufficient movement of the clutch control member 100 to move the clutch roller 90 out of frictional or locking engagement with the bar 83 and the abutment block 94.

Resilient means is provided for urging the clutch member 90 toward lever retaining or clutching position. As particularly shown in Figures 2 and 4, the stub shaft 116 is provided with an extension 117 which accommodates a central coiled region of a spring 136, one leg 137 of the spring being in engagement with a ledge 138 formed on the support 50, the other leg 140 of the spring engaging an edge region of one of the walls 114 of member 112 as shown in Figure 4. The spring 136 is tensioned to normally bias or urge the member or auxiliary lever 112 in a clockwise direction, as viewed in Figure 2, about the axis of the stub shaft 116 which bias is transferred through the link 118 to the arm 109 formed on the clutch control member 100, biasing the latter in a clockwise direction about the axis of the shaft 78 to direct the clutch roller 90 into frictional engagement with the convergently arranged surfaces 92 and 94 of the bar 83 and abutment block 94.

The upper end regions of the lever components 58 and 60 are formed with forwardly extending projections 140 provided with openings to receive a clevis pin 142 for pivotally joining a clevis 144 with the lever construction 55. The flexible cable 37 is joined or secured to the clevis 144 by suitable means.

Resilient or yieldable means is provided for absorbing or resisting the thrust or impact of the lever upon its return to brake release position and for determining the release or normal position of the lever construction 55. As particularly shown in Figures 2 and 3, the upper end region of the lever components 58 and 60 are formed with transversely extending projections 146 and surrounding the projections is a rectangularly shaped buffer or abutment 148 formed of semi-hard rubber or the like, the projections 146 extending into a hollow interior of the abutment member 148. In brake release or initial position of the lever as shown in Figures 1 and 2, the resilient abutment 148 engages an edge surface 150 formed on the support 50 for limiting return movement of the brake lever 56 to brake release position.

The operation of the arrangement shown in Figures 1 through 4 is as follows: When the vehicle operator desires to set the emergency or parking brake mechanism of the vehicle, he exerts foot pressure on the pad 74 swinging the lever 55 in a clockwise direction about its fulcrum 68 as viewed in Figures 1 and 2.

This action pulls the cable 37 through the sheath or guide 39 and, through the clevis 144, moves the arm 30 and shaft 23 in a direction exerting a pull upon the brake rod 29 shown in Figure 1 to effect a setting of the brake mechanism with which the rod 29 is connected.

During movement of the brake actuating lever construction 55 toward brake setting position, the spring 136 biases the clutch control member 100 in a clockwise direction about its pivotal support 78 whereby the edge walls 106 of the slots in the member 100 engaging the tenons 108 on the clutch roller 90 continuously moves the clutch roller toward frictional wedging or locking engagement between the bar 83 and the abutment block 94. Thus when the lever construction 55 has been moved to brake setting position or any position of adjustment, the clutch roller 90 prevents retractive movement of the lever and holds or retains the brakes in set position.

When the operator desires to release the parking brakes or return the lever 56 to normal position, he grasps the handle 134 and exerts an upward pull upon the lever construction consisting of member 112 and the rod 130, which movement is transferred through the link 118 to the member 100, swinging the member 100 about its pivotal support 78 in a counterclockwise direction as viewed in Figures 1 and 2, moving the clutch roller 90 out of wedging or frictional locking engagement with the bar 83 and the abutment block 94.

The lever 56, under the tension of the spring 40 which is transmitted to the lever through the cable 37, is moved in a counterclockwise direction about its fulcrum or support 68 until the resilient abutment 148 engages the stop means provided by the edge surface 150 formed on the support 50.

Figures 5 through 9 illustrate another form of arrangement for controlling the clutch means for holding a lever construction of the foot operated type in brake set position and for releasing the same. In this form of construction, the lever arrangement 150 includes a lever 154 fulcrumed upon a suitable bracket or support 152 by means of a fulcrum pin or rivet 68'. The lever 154 is formed of two matched or mating sections 154 and 155 formed of sheet metal, the lever being provided at its lower end with a pad portion 157 supporting a rubber foot pad 158. The upper portions of the components 154 and 155 of the lever body are provided with forwardly extending projections 160 which are connected by means of a pivot pin 142' with a clevis 144' adapted to be connected with the cable 37 in the manner shown in Figure 2 and hereinbefore described. The sheath 39' is secured to the bracket 152 by means of a clamp 54'.

The upper walls or wall portions 162 of the components 154 and 155 are provided with openings to receive a rivet or stub shaft 78' which journally supports an abutment sleeve or bushing 80' forming a thrust surface for the arcuately shaped bar 83', the latter being fashioned with an enlarged circular head portion 84' which is carried in a suitable circularly shaped recess formed in the support or bracket 152.

The walls 162 of the lever sections are formed with rectangularly shaped openings to accommodate the abutment block 94'. The walls 162 are provided with openings 88' to accommodate shoulder portions 164 formed on a clutch member or clutch roller 166 which is of a construction similar to the clutch roller 90 shown in the arrangement of Figures 1 through 4. A clutch control member 168, similar to the clutch control member 100 shown in Figure 2 is provided and equipped with open ended slots 106' adapted to snugly accommodate tenons 170 formed on the clutch roller 166. The function and operation of the clutch roller 166 is substantially the same as the function and operation of the clutch roller 90 hereinbefore described and shown in the arrangement of Figures 1 through 4.

The clutch control member 168 is of U-shaped configuration having spaced parallel wall portions 174 which straddle the upper regions of the lever 154, the member 168 being fulcrumed or pivotally supported upon the rivet 78'. The member 168 is formed with a depending arm 176 which is connected to one end of a rod or link 178 in the manner shown in Figure 6.

Pivotally supported upon a rivet or pin 180 extending through an opening in the support 152 is a depending member or lever 182. The member 182 is formed with two spaced walls or wall portions 184 and 185, the supporting shaft or rivet 180 extending through aligned openings formed in the walls 184 and 185 and through an opening in the support 152. A handle member or grip portion 187 is provided for the member 182 and has a tenon portion 188 extending between the wall portions 184 and 185 and secured thereto by means of rivets 190.

The clutch control member 168 is biased toward clutching position under the influence of a contractile coil spring 192, one end of the spring being anchored to a pin 193 carried by the support 152, the other end 194 being hooked into an opening formed in a wall of member 182 as particularly shown in Figure 8.

The arrangement shown in Figures 5 through 9 embodies a modified form of resilient abutment means for determining the initial or brake release position of the lever construction 150. As shown in Figures 5 and 9, there is secured to the support 152 a rectangularly shaped block or member 196 formed of semi-hard rubber or similar material which is surrounded by a sheet-metal casing 197. The supporting bracket 152, the block 196 and the sheet metal casing 197 are formed with aligned openings to receive a pair of rivets 198 to secure the block to the support as illustrated in Figure 9. The upper region of the lever component 155 is formed with a laterally extending flange 199 of substantial width which, when the lever 154 is in full brake released position, engages the rubber block or abutment 196. The resiliency of the block 196 serves to cushion or absorb the impact of the lever 150 when the same is rapidly moved toward released position under the influence of the brake return spring 40 shown in Figure 1.

The operation of the arrangement shown in Figures 5 through 9 inclusive is substantially the same as that of the arrangement shown in Figures 1 through 4 and is as follows: When the operator desires to set the emergency or parking brakes of the vehicle, foot pressure is exerted on the foot pad 158 to swing the lever 154 about the fulcrum 68' in a clockwise direction as viewed in Figure 5. This movement of the lever 154 moves the cable 37 and effects a setting of the parking brakes of the vehicle.

The contractile spring 192 constantly biases the clutch control member 168 in a clockwise direction about its pivotal support 78' so that the clutch roller 166 is frictionally engaged with the abutment block 94' and the upper arcuate surface of the bar 83' and holds the brakes in set position.

When the operator desires to release the emergency or parking brakes, he grasps the handle member 187 disposed adjacent and just beneath the instrument panel of the vehicle and exerts an upward pull on the handle 187, which movement rotates the member or lever 182 in a counterclockwise direction as viewed in Figure 5 about its pivotal support 180. This movement is transmitted by means of the rod or link 178 and the arm 176 to the clutch control member 168, swinging the latter in a counterclockwise direction about the pivotal support 78' to move the clutch roller or clutch member 166 out of clutching engagement with the bar 83' and the abutment block 94'. The tension on the brake operating cable 37 moves the lever 150 in a counterclockwise direction as viewed in Figure 5 about its fulcrum 68' until the flange 199 on the lever construction engages the resilient abutment block 196. In this position the brakes are in fully released condition.

It should be noted in both forms of the invention that the connection between the link 118 and the arm 109 shown in Figure 2 and the connection between the link 178 and the arm 176 shown in Figure 5 are at the axes of the lever fulcrums 68 and 68' respectively.

The connections of the release mechanisms with the clutch actuating members being aligned with the axes of the lever fulcrums, rotative or swinging movement of the levers 55 or 154 do not affect the relation between the clutch rollers 90 and 166, the abutment blocks 94, 94' and the arcuate members 83 and 83' as the arcuate surfaces of the latter members are generated about the axes of the lever fulcrums. Hence the clutch mechanisms in both forms of foot operated lever construction are rendered effective to hold the same in adjusted or brake setting positions, and release of the clutch members effected irrespective of the relative positions of the lever constructions 55 or 154. Through the provision of auxiliary or supplemental lever arrangements 112 and 182 as shown herein, very little manual effort is required in order to move the clutch rollers out of lever retaining positions.

It is apparent that, within the scope of the invention, modifications and different arrangements may be made other than is herein disclosed, and the present disclosure is illustrative merely, the invention comprehending all variations thereof.

I claim:

Mechanism control including, in combination, a relatively stationary support, a foot-operated lever fulcrumed on the support, a bar connected with the support, a block mounted by the lever, a roller arranged for cooperative engagement with said bar and block for retaining the foot-operated lever in various positions of adjustment, a control member pivotally supported on the foot-operated lever, a supplemental lever construction for actuating the control member including a lever element pivoted upon the support at a region spaced from the fulcrum of the foot-operated lever, a hand grip associated with said element, a link pivotally connected with the lever element and the control member, and resilient means for biasing the control member in a direction to urge the roller into engaging relation with the bar and block.

References Cited in the file of this patent

UNITED STATES PATENTS

| | | |
|---|---|---|
| 1,657,738 | Booth | Jan. 31, 1928 |
| 2,014,300 | Strobridge | Sept. 10, 1935 |
| 2,160,679 | Sandberg | May 30, 1939 |
| 2,299,508 | Skareen | Oct. 20, 1942 |
| 2,309,454 | Heller | Jan. 26, 1943 |
| 2,467,557 | Jandus | Apr. 19, 1949 |
| 2,587,725 | Hinsey | Mar. 4, 1952 |
| 2,638,017 | Sprung | May 12, 1953 |
| 2,694,945 | Jandus | Nov. 23, 1954 |
| 2,722,136 | Krause | Nov. 1, 1955 |
| 2,781,117 | McLeod | Feb. 12, 1957 |
| 2,851,900 | Powell | Sept. 16, 1958 |
| 2,875,641 | Powell | Mar. 3, 1959 |
| 2,884,805 | Krause | May 5, 1959 |
| 2,893,262 | Krause | July 7, 1959 |